United States Patent [19]

Smolinski et al.

[11] Patent Number: 5,142,778

[45] Date of Patent: Sep. 1, 1992

[54] GAS TURBINE ENGINE COMPONENT REPAIR

[75] Inventors: John J. Smolinski, Southington; Peter J. Draghi, Simsbury; John R. Danielsen, East Hartford, all of Conn.

[73] Assignee: United Technolgies Corporation, Hartford, Conn.

[21] Appl. No.: 668,580

[22] Filed: Mar. 13, 1991

[51] Int. Cl.⁵ ............... B23P 19/02; B23K 26/00; B23K 31/00

[52] U.S. Cl. ............... 29/889.1; 29/889.7; 29/402.07; 29/402.18; 228/119; 219/121.66; 219/121.85

[58] Field of Search ............ 228/119; 29/889.1, 889.7, 29/402.07, 402.18; 219/121.65, 121.66, 121.85

[56] References Cited

U.S. PATENT DOCUMENTS

| | | | |
|---|---|---|---|
| 4,019,014 | 4/1977 | Byrne | 228/119 |
| 4,122,240 | 10/1978 | Banas et al. | 428/655 |
| 4,644,127 | 2/1987 | La Rocca | 219/121.85 |
| 4,655,383 | 4/1987 | Fournes et al. | 228/119 |
| 4,705,203 | 11/1987 | McComas et al. | 228/119 |
| 4,726,101 | 2/1988 | Draghi et al. | 29/156.8 B |
| 4,830,265 | 5/1989 | Kennedy et al. | 219/121.85 |
| 4,842,183 | 6/1989 | Antony et al. | 228/119 |
| 4,878,953 | 11/1989 | Saltzman et al. | 148/4 |

FOREIGN PATENT DOCUMENTS

| | | |
|---|---|---|
| 0317830 | 11/1987 | European Pat. Off. |
| 0176093 | 10/1983 | Japan ............... 228/119 |

*Primary Examiner*—Richard K. Seidel
*Assistant Examiner*—Chuck Y. Mah
*Attorney, Agent, or Firm*—Robert J. Parizek; Charles E. Sohl

[57] ABSTRACT

A procedure is described for the repair of gas turbine engine turbine components which involves the repair of cracks and other defects and the replacement of worn or eroded material followed by the laser melting of a thin layer of metal on the surface of the component in those areas requiring reconfiguration to return to the original dimensions. The reconfiguration by laser melting is also useful for new articles which are out of tolerance, and generally for shaping objects from metal sheet or plate.

12 Claims, 2 Drawing Sheets

U.S. Patent    Sep. 1, 1992    Sheet 1 of 2    5,142,778
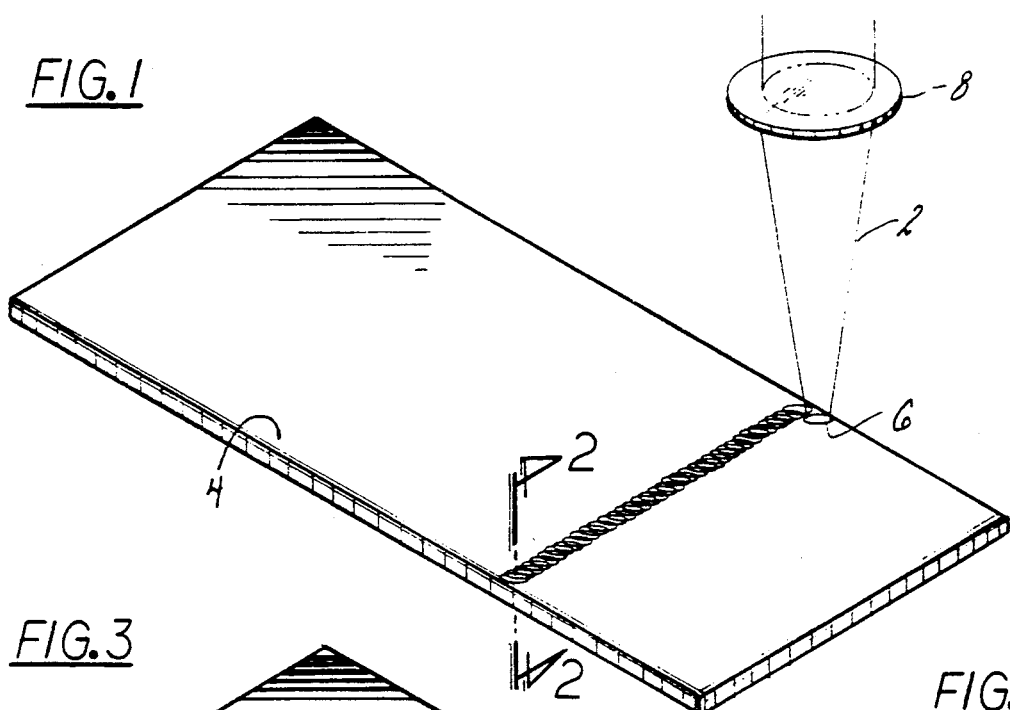
FIG.1
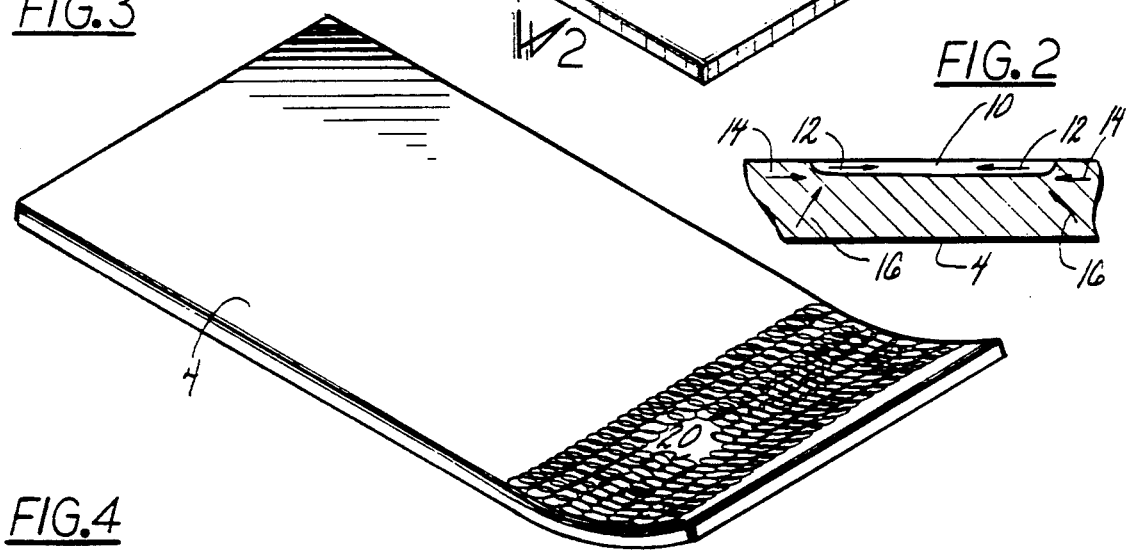
FIG.3
FIG.2
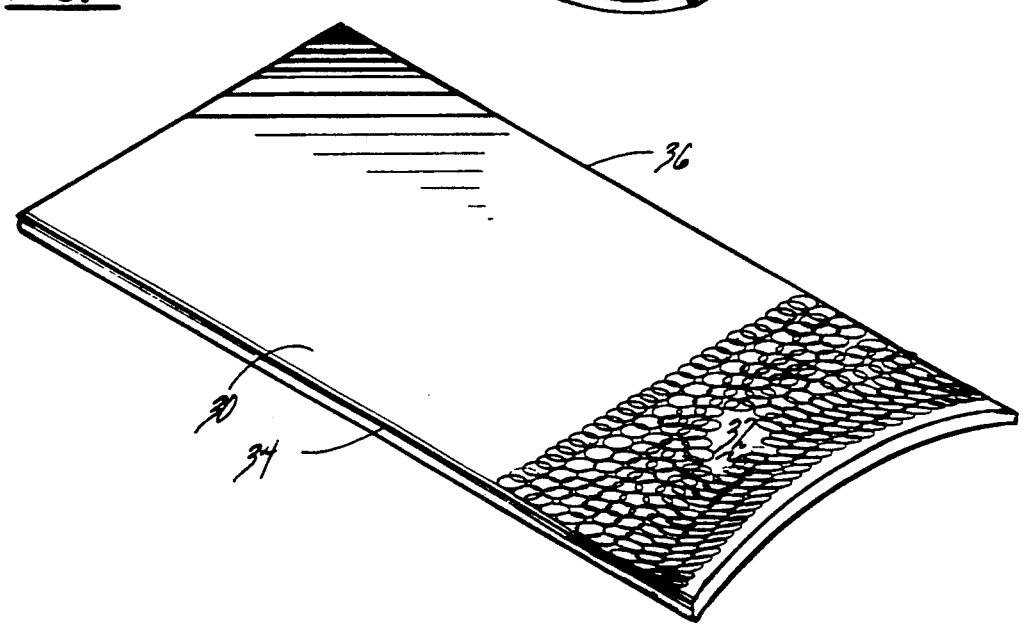
FIG.4

GAS TURBINE ENGINE COMPONENT REPAIR

TECHNICAL FIELD

This invention relates to gas turbine engine components and more particularly to a method of repairing worn and/or damaged components by adding material and reconfiguring the airfoil contours. This invention also relates to laser processing of materials.

BACKGROUND ART

A gas turbine engine includes a compressor section, a combustion section and a turbine section. Disposed within the turbine section are alternating rings of moving blades and stationary vanes. The rings, or stages, of vanes and blades are situated such that the axes of the rings are co-located with the axis of the gas turbine engine. The blades are mounted on a disk which rotates about its central axis. As hot combustion gases exit the combustor and pass through the turbine section, the disks with blades mounted thereon are rotatably driven, turning a shaft, and thereby providing shaft work for driving the compressor section and other auxiliary systems. Higher gas temperatures mean that more work can be extracted from the gases in the turbine section, thus increasing the overall efficiency of the gas turbine engine. By using cobalt and nickel-base superalloy materials, which maintain mechanical strength at high temperatures, the operating temperature capability of the turbine section is increased.

The stationary vanes disposed between the rings of moving blades stabilize and direct the gas flow from one stage of moving turbine blades to the next stage. The stabilization of the gas flow optimizes the amount of work extracted from the hot gases in the turbine section. The most efficient operation occurs when the nozzle flow areas, defined as the spaces between adjacent vanes in a vane ring, are all approximately equal.

In order to group vanes so that all nozzle flow areas in an assembled vane ring are approximately equal, the vanes are classified in groups according to ranges of flow area. For one particular engine model, the acceptable flow areas for one stage of stationary vanes range from 1.868–1.894 square inches.

In service, deterioration of the vane surface occurs due to oxidation, cracking and metal erosion caused by abrasives and corrosives in the flowing gas stream. In addition, the high gas pressures at high temperature cause distortion of the vanes, thereby enlarging the nozzle area with a consequent loss in turbine efficiency. During periodic engine overhauls, the vanes are inspected for physical damage and measured to determine the degree of flow area change and the effect on nozzle flow area classification. Before these vanes can be returned to the engine, any physical damage must be repaired and the vanes otherwise reclassified.

Several methods exist for repairing the worn or damaged vanes and for returning the nozzle gas flow area to the original classification. Repair methods include, for example, conventional fusion welding, plasma spray as described in, for example, U.S. Pat. No. 4,878,953, and the use of a tape material containing a mixture of a binder and a metal alloy powder which is compatible with the substrate alloy. The metal alloy mixture is formed into a flexible tape of uniform thickness and backed with an adhesive. After the tape is added to the vane, the vane is heated to a temperature at which the adhesive and binder decompose and at which diffusion occurs between the alloy powder and the substrate alloy. This latter technique is described in U.S. Pat. No. 4,726,101 issued to Draghi et al., which is incorporated herein by reference.

Methods for reclassifying the vanes to change the area between adjacent vanes include, for example, hot striking or otherwise bending the trailing edge of the vane, and adding material to the airfoil surface to change its contour, using, for example, the techniques listed above for vane repair. Hot striking, in addition to requiring a very expensive set of contour dies and end locators for each vane configuration, can cause cracking in the airfoil or distortion of the vane platform. The contour dies and locators experience wear and distortion during use, and require frequent refurbishment. Hot striking does not provide a consistent amount of reconfiguration due to dimensional variations in the vanes. Additionally, hot striking is not permitted on several high temperature alloys used in gas turbine engines due to the deleterious effects on material properties such as fatigue strength.

Reconfiguring by building up large amounts of material on the surface of the airfoil is very labor intensive and wasteful of the materials used for building up the surface, making the process very expensive. Consequently, a need has arisen for a cost effective method of repairing and reclassifying turbine vanes.

DISCLOSURE OF INVENTION

It is an object of the present invention to provide a simple, more cost effective, and more consistent method for repairing and reclassifying turbine vanes. This and other objects of the present invention are achieved by repairing defects and replacing eroded material, and reclassifying by directing a laser beam toward the surface of the vane to be relocated. The function of the laser beam is to locally melt a thin layer of the vane surface, which is then allowed to solidify. Contraction of this solidified layer during cooling generates tensile forces on the underlying substrate, causing the substrate material to form a concave configuration, or cup, in a direction toward the source of the laser beam. By application of the laser beam to the surface of the vane in a predetermined pattern, a wide range of movement may be imparted to the vane, thus permitting significant changes in airfoil contour. These changes in contour are hereinafter referred to as reconfiguration.

When no repairs are required, the laser beam is applied directly to the surface of the vane. When it is necessary to repair defects or to replace eroded material, a preferred method is to use a metallic powder tape material as described in U.S. Pat. No. 4,726,101. In this case, the laser beam is applied to the surface of the metallic layer deposited during the repair/build-up operation. In either case, with or without repair, it may be necessary to remove the material affected by the laser application from the surface using any of various conventional techniques.

The foregoing and other features and advantages of the present invention will become more apparent from the following description and accompanying drawings.

BRIEF DESCRIPTION OF DRAWINGS

FIG. 1 is a perspective view of a laser beam striking the surface of a test sample.

FIG. 2 is a cross-section through an area on the surface of a test specimen which has been struck by a laser beam.

FIG. 3 is a perspective view of the specimen of FIG. 1 showing the deformation due to the laser beam.

FIG. 4 is a perspective view of a specimen as in FIG. 3 which has been constrained along the edges of the specimen.

BEST MODE FOR CARRYING OUT THE INVENTION

Figure 5:
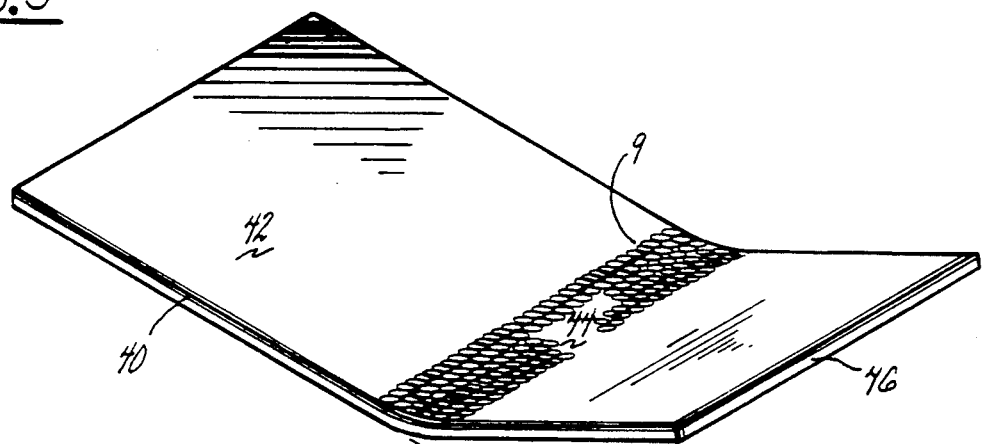
FIG. 5 is a perspective view of a test specimen where a band across the width of the specimen has been struck by a laser beam.

The essential aspect of the invention is that the brief localized application of the laser beam to the surface of a thin metallic article can cause a change in the overall shape of the article. By controlling the pattern of the laser application on the article, the change in shape of the article can be controlled.

The invention may be understood through reference to FIG. 1, which shows a pulsed laser beam 2 striking the surface of a metal test specimen 4 at a point 6 after passing through a focusing lens 8. As shown in FIG. 2, the laser beam melts a thin layer 10 of the test specimen 4. Almost instantaneously after termination of the laser beam, the thin pool of molten metal solidifies, forming what is hereinafter referred to as a recast layer. At the instant of solidification, the recast layer 10 is at the melting point of the metal, while the underlying substrate is at essentially ambient temperature. As heat is withdrawn from the recast layer by the substrate, the recast layer contracts in accordance with its coefficient of thermal expansion. The contraction of the recast layer 10 creates tensile forces within the recast layer indicated by the arrows 12. This in turn creates tensile stresses in the substrate material surrounding the recast layer as indicated by the arrows 14 and ultimately bending forces in the substrate layer as indicated by the arrows 16. In the instance of a single laser strike, this tends to form a cup in the material with the recast spot at the center of the cup.

Referring again to FIG. 1, the pulsed laser beam was stepped across the width of a test specimen 4 in a predetermined pattern of rows 9 of laser strikes. The test specimen was 2 inches wide by 6 inches long by 0.090 inches thick, and was made of a cobalt base alloy with 20.0 percent Cr, 10.0 percent Ni, 15.0 percent W, 1.5 percent Mn and 0.10 percent C, with all contents expressed in weight percent. This alloy is hereinafter referred to as AMS 5537. The operating parameters of the laser are listed in Table I.

TABLE I

| Energy Output | 20 Joules/pulse |
|---|---|
| Pulse Duration | 2 Milliseconds |
| Pulse Frequency | 10 Pulses/second |
| Beam Traverse Speed | 10 Inches/minute |
| Beam Focal Length | 10 Inches |
| Defocus of Beam | 2 Inches |
| Row-To-Row Spacing | 0.100 Inches |
| Defocussed Beam Diameter | 0.150 Inches |

The melted spot caused by each laser strike was approximately 0.125 inches diameter by 0.001 inches thick. The laser strikes were patterned such that the spots overlapped to provide complete coverage of the surface. The melting and solidification due to the application of the laser beam to the surface of the test specimen 4 caused a uniform concave reconfiguration of the test material as shown in FIG. 3, where the entire end 20 of the test specimen was exposed to laser strikes.

While the principle of reconfiguration by striking the surface of an object with a laser beam has been illustrated with a particular cobalt base alloy, it will be understood by those skilled in the art that articles composed of other materials, such as iron, titanium or nickel base superalloys could also benefit from the method of the present invention.

It was determined that a higher energy laser beam melted a thicker layer of metal at the surface of the material. A slightly greater degree of curvature was obtained on similar specimens. However, the higher energy input of the beam caused overheating of the test specimen, resulting in greater surface roughness, discoloration and changes in the properties of a thicker layer of material than necessary for reconfiguration, thus requiring removal of more material than if the recast layer is thinner.

FIG. 4 shows a test specimen 30 with a configuration which would result from the laser beam exposure described in Table I to the region 32 if the test specimen were constrained along the edges 34, 36.

FIG. 5 shows a test specimen of AMS 5537 where the laser beam described in Table I was applied to the surface 42 in the region 44 which lies between 1 5/32 inches and 1 23/32 inches from the end 46 of the specimen. A single array of laser strikes in this area (six rows of overlapping spots) caused a curvature of the specimen sufficient to raise the end 46 of the specimen to a distance 48 equal to 7/32 inches. A repeat application of the laser beam in the same area of the specimen caused the end of the specimen to be elevated to a distance 48 of 7/16 inches, and a total of four applications of the laser beam to the same area caused an elevation of the end of the specimen of 27/32 inches. Thus, it was shown that repeat applications of the laser beam to the surface produce additive effects in an unconstrained specimen.

Although the tests described have utilized straight-line patterns of laser strikes running across the width of a specimen, it will be obvious to those skilled in the art that modifications of the pattern direction, spot density and number of applications will permit the formation of various shaped objects, that the same results would be achieved with the use of a continuous wave laser, and that other energy sources, for example electron beam, could be used.

The change and shape of the test specimens has been shown to be caused by the stresses generated during the cooling of the recast layer from the melting point of the material to the ambient temperature of the substrate layer. It was determined that stress relieving the test samples at 2100° F. for two hours resulted in negligible relaxation in the curvature of the specimen. It was also determined that removal of the recast layer by grit blasting of approximately 0.002–0.005 inches of material from the surface resulted in approximately 15% relaxation in the curvature of the specimen. (Compressive stresses imparted by the grit blast operation may have affected this result significantly.) Thus, it was established that the changes in configuration of the material due to the laser melting of the surface layer are permanent changes with no significant tendency to return to the prior shape of the material.

It was also established in tests described below on jet engine hardware that engine components overlaid and alloyed with material of properties and composition similar to that of the substrate material could be processed using the laser technique described above. The configuration of the component was changed in a manner similar to that described above. When the recast layer in the overlaid material was removed, the reconfigured component retained its newly acquired shape.

Figure 6:
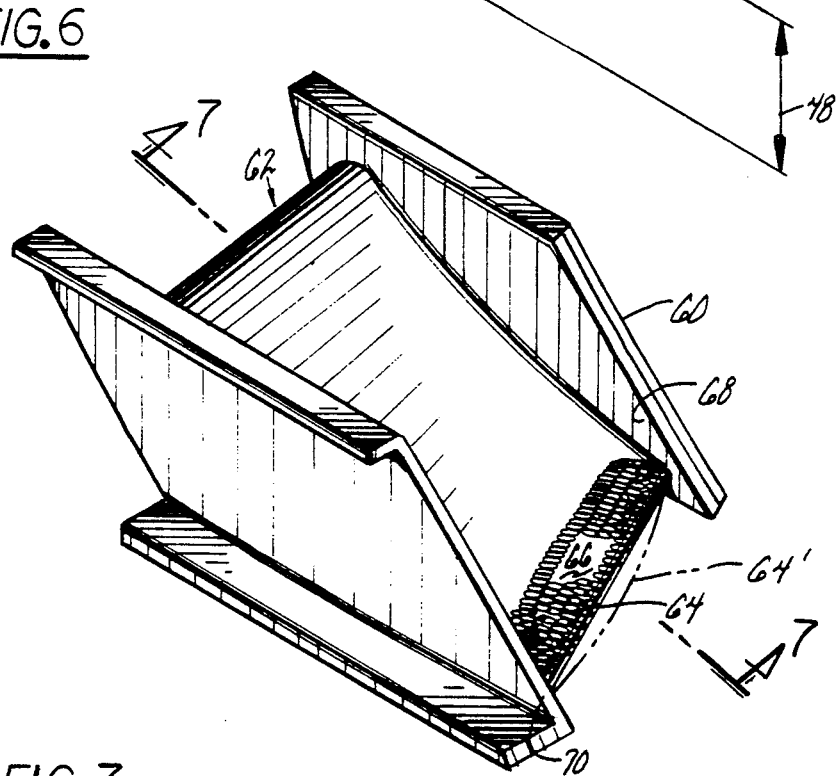
FIG. 6 is a perspective view of a gas turbine engine turbine vane.
Figure 7:
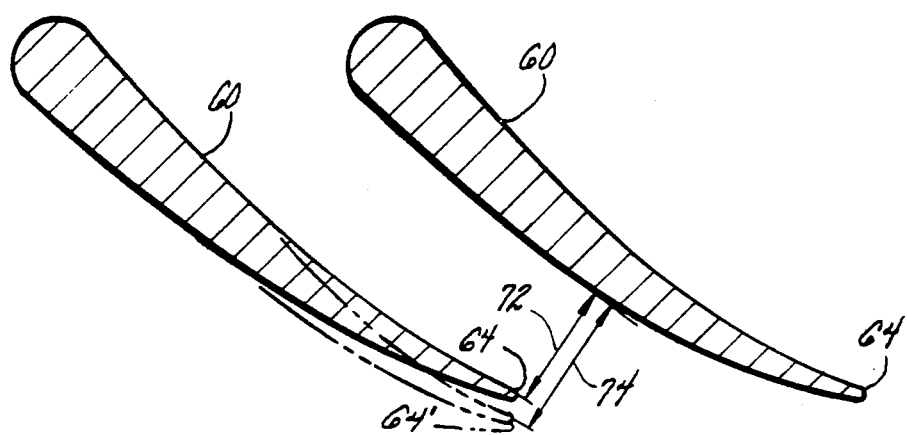
FIG. 7 is a cross-section at 7—7 of the turbine vane of FIG. 6.

The invention will be better understood by reference to the following example. Referring to FIG. 6, a turbine vane 60 made from a cobalt base alloy containing, by weight, 23.4% Cr, 10.0% Ni, 7.0% W, 3.5% Ta, 0.5% Zr, 0.2% Ti and 0.6% C, commonly known as Mar-M 509, was chemically stripped to remove the protective coating. The vane was examined and fluorescent penetrant inspected for any cracks or other defects acquired during service, and was dimensionally inspected to determine the amount of erosion and distortion which had occurred. The nature of the distortion of the airfoil 62 typically found in used turbine vanes is depicted by the trailing edge 64' of a used vane shown as a broken line. The design configuration of the trailing edge 64 is shown as a solid line. This is also shown in FIG. 7, which is a sectional view at 7—7 of FIG. 6. The position of the design configuration trailing edge 64 provides a spacing 72 between the adjacent vanes 60. A vane distorted in service has its trailing edge 64' displaced such that the spacing 74 is greater than the spacing 72 for a design configuration vane. This greater spacing results in a larger nozzle flow area between the vanes, as discussed above.

The eroded and damaged areas were overlaid with metal powder tape as described above. The vane was heated in a furnace to fuse the metal powder to fill any cracks or voids and build up the eroded areas to at least their original thicknesses. The overlaid layer was smoothed. A pulsed laser beam was directed at the airfoil surface of the vane using the parameters described in Table I. The pattern 66 of laser strikes is designed to provide the necessary reconfiguration while avoiding undue stresses at the juncture of the airfoil 62 with the platforms 68, 70. In this manner, the airfoil surface was returned to its original configuration. After hand polishing to remove the recast layer and any excess of the overlaid material, the vane was prepared for reapplication of the protective coating.

While the principles and procedures are described herein for use on a turbine vane which required certain repair procedures, it will be obvious to those skilled in the art that the same reconfiguration method could be applied to articles in the original manufacturing process which fail to conform to dimensional requirements.

Although this invention has been shown and described with respect to detailed embodiments thereof, it will be understood by those skilled in the art that various changes in form and detail thereof may be made without departing from the spirit and scope of the claimed invention.

We claim:

1. A method for the repair and reconfiguration of a gas turbine engine turbine component which is covered by a protective coating comprising the steps of:
    a. removing said protective coating from the surfaces of said component;
    b. inspecting said component for defects and erosion of material, and for distortion from its original configuration;
    c. adding material to said surfaces of said component in the areas requiring repair or replacement of eroded material;
    d. bonding said added material to said component;
    e. directing a laser beam at said surface of said component in said distorted areas such that localized areas of said surface of said distorted areas are melted, solidified and cooled to ambient temperature, thus forming a recast layer;
    f. removing any excess material from said surface of said component; and
    g. reapplying said protective coating to said surfaces of said component.

2. A method as recited in claim 1 wherein said recast layer is up to 0.010 inches thick.

3. A method as recited in claim 1 wherein said recast layer is between about 0.0005 and 0.001 inches thick.

4. A method as recited in claim 1, wherein said recast layer is removed from said component.

5. A method as recited in claim 1 wherein the surface of said added material is smoothed prior to laser melting.

6. A method for the repair and reconfiguration of a gas turbine engine turbine component which is covered by a protective coating comprising the steps of:
    a. removing said protective coating from the surfaces of said component;
    b. inspecting said component for defects and erosion of material, and for distortion from its original configuration;
    c. adding material to said surface of said component in the areas requiring repair or replacement of eroded material;
    d. alloying said added material to said component;
    e. directing a laser beam at said surface of said component in said distorted areas such that localized areas of said surface of said distorted areas are melted, solidified and cooled to ambient temperature thus forming a recast layer;
    f. dimensionally inspecting said component to determine whether additional reconfiguring is necessary;
    g. repeating steps f. and g. as necessary to achieve the desired configuration;
    h. removing any excess material from said surface of said component; and
    i. reapplying said protective coating to said surfaces of said component.

7. A method as recited in claim 6 wherein said recast layer is up to 0.010 inches thick.

8. A method as recited in claim 6 wherein said recast layer us between about 0.0005 and 0.001 inches thick.

9. A method as recited in claim 6, wherein said recast layer is removed from said component.

10. A method as recited in claim 6 wherein the surface of said added material is smoothed prior to laser melting.

11. A method for reconfiguring a metal object comprising the steps of:
    a: directing a laser beam at the surface of said metal object, said laser beam providing an energy input to said metal object such that said laser beam melts a thin layer of metal on said surface of said metal object;

b. permitting said melted layer to solidify and cool, thus forming a recast layer;
c. repeating said melting process in a predetermined pattern over an area of said object, thus forming a reconfigured object; and
d. removing said recast layer from said reconfigured object.

12. A method for reconfiguring a metal object comprising the steps of:
a. directing a laser beam at the surface of said metal object, said laser beam being such that it melts a layer of metal on said surface of said metal object;
b. permitting said melted layer to solidify and cool, thus forming a recast layer;
c. repeating said melting process in a predetermined array over an area of said object;
d. dimensionally inspecting said object to determine whether additional reconfiguring is necessary;
e. repeating steps c. and d. as necessary to achieve the desired configuration, thus forming a reconfigured object; and
f. removing said recast layer from said reconfigured object.

* * * * *